United States Patent

Ribka et al.

[11] 4,079,040
[45] Mar. 14, 1978

[54] SULFO-CONTAINING PHENOL-FORMALDEHYDE CONDENSATES

[75] Inventors: Joachim Ribka, Offenbach am Main-Burgel; Otto Trösken, Frankfurt am Main; Karlfried Keller, Bergen-Enkheim; Erwin Herrmann, Frankfurt am Main; Wolfgang Bodenstedt, Frankfurt am Main; Peter Dorries, Frankfurt am Main, all of Germany

[73] Assignee: Cassella Farbwerke Mainkur Aktiengesellschaft, Germany

[21] Appl. No.: 573,592

[22] Filed: Apr. 30, 1975

[30] Foreign Application Priority Data

May 2, 1974 Germany .............. 2421222

[51] Int. Cl.² .............................. C08G 8/28
[52] U.S. Cl. ................... 260/49; 260/29.3; 260/38; 260/51 R
[58] Field of Search ............ 260/38, 49, 51, 29.3

[56] References Cited

U.S. PATENT DOCUMENTS

| B 465,955 | 2/1976 | Schaupp .................... 260/49 |
| 2,357,798 | 9/1944 | Neiderhauser et al. .......... 260/49 |
| 2,621,164 | 12/1952 | Nagy ......................... 260/49 |
| 3,065,039 | 11/1962 | Komarek ..................... 260/49 |
| 3,221,079 | 11/1965 | Harris ....................... 260/49 |
| 3,502,610 | 3/1970 | Thompson .................... 260/38 |
| 3,640,932 | 2/1972 | Schnur ....................... 260/29.3 |
| 3,644,269 | 2/1972 | Hoyt et al. .................. 260/51 |
| 3,931,083 | 1/1976 | Sasaki et al. ................ 260/29.3 |

*Primary Examiner*—V. P. Hoke
*Attorney, Agent, or Firm*—Connolly and Hutz

[57] ABSTRACT

Spreadability and/or strength of water-setting inorganic bonding compositions are improved by incorporating in them a water-soluble condensation product of formaldehyde with a diphenol

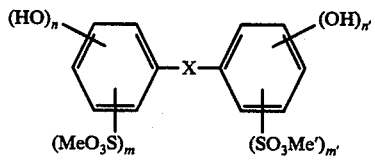

The condensation can also take place in the presence of a water-soluble sulfite, a water-soluble sulfamate, a water-soluble pyrosulfite, a phenol sulfonic acid or a naphthalene sulfonic acid.

4 Claims, No Drawings

SULFO-CONTAINING PHENOL-FORMALDEHYDE CONDENSATES

The present invention relates to additives for improving the mechanical characteristics of water-setting, inorganic bonding compositions such as concrete, cement, mortar and plaster.

Water-setting, inorganic bonding compositions are indispensable to the building industry. Of particular importance to the construction industry are so-called cement prepared from hydraulic cement, sand, and water; concrete prepared from hydraulic cement, sand, gravel or other aggregates (ground silicate material, such as stone powder or ground blast-furnace slag, limestone powder, kaolin, or diatomaceous earth) of selected particle sizes, and water; lime mortar prepared from hydraulic cement, slaked lime, sand and water; and plaster prepared from plaster of paris and water. The building materials are generally prepared immediately prior to processing, using as much water as is necessary to obtain a paste-like or pourable mixture suitable for the intended purpose. The hardening characteristics and the physical properties of the hardened building materials — early and end strength — change with the quantity of the mixing water employed. For example for cement, mortar or concrete, it has been shown that the early strength and also the end strength is greater if proportionally less mixing water is employed for the preparation of these mixtures. In view of these important properties of the building materials, it would be desirable to work with as little water as possible. However the achievement of this goal is limited in most cases by the need for good spreadability, pourability or pumpability.

There has been no lack of experiments to improve flowability of such building materials and thus to reduce the required quantity of mixing water. German Auslegeschrift 1 671 017 discloses for this purpose the addition of aminotriazine resin modified with sulfite or sulfonic acid. German Offenlegungsschrift 2 204 275 discloses the liquefaction of mineral bonding compositions with additives prepared by the condensation of phenols with sulfuric acid and formaldehyde, and the subsequent reaction of the condensate with substituted or etherified glycols.

These known additives however have only moderate effects when added in acceptable amounts.

Among the objects of the present invention is the provision of such additives that are simple to manufacture and use, as well as very effective.

The foregoing as well as additional objects of the present invention will be more fully discussed in the following description of several of its embodiments.

According to the present invention very desirable additives of the foregoing type are the water-soluble condensation products produced by reacting formaldehyde with the diphenol

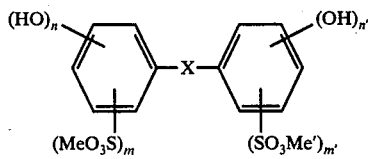

wherein
X is a direct bond or $-SO_2-$, $-SO-$, $-S-$, $-CH_2-$, $-C(CH_3)_2-$, or $-CO-$, $n$ and $n'$ are independently 1 or 2,
$m$ and $m'$ are independently 0, 1 or 2; and
Me and Me' are independently a proton or an alkali metal, alkaline earth metal or ammonium cation.

The condensation can be carried out at temperatures of about 100° C until a 20% by weight aqueous solution of the solid condensation product shows at 25° C a surface tension of about 60 to about 80 milliNewtons per meter.

Typical diphenols which may be employed for the preparation of the additives of the present invention are, for example, 4,4'-dihydroxydiphenylsulfone; 4,4'-dihydroxydiphenylsulfoxide; 3,3'-dihydroxydiphenylsulfide; 2,2'-dihydroxydiphenylmethane; 4,4'-dihydroxydiphenyldimethylmethane; 2,4'-dihydroxybenzophenone; 2,3'-dihydroxydiphenyl; 2,4,2',4'-tetrahydroxydiphenylsulfone; -diphenylsulfoxide, -diphenylsulfide, -diphenylmethane, -diphenyldimethylmethane, - benzophenone and -diphenyl; and the sulfo-substituted derivatives of these diphenols. Particularly desirable condensation products are those in which X is a direct bond or a bridge of the formula $-C(CH_3)_2-$ or $-SO_2-$, the $-SO_2-$ bridge being most preferred, as are the condensation products which contain at least one sulfo group per one mol diphenol.

The diphenols reacted with the formaldehyde need not be carefully purified, and indeed these diphenols can be in the form of crude reaction products themselves, particularly the crude sulfonated products produced by reacting the unsulfonated or partly sulfonated starting materials with sulfuric acid or oleum, in accordance with Ullmanns Encyklopadie der technischen Chemie, Third Edition, Vol 13, page 452, for example. These crude sulfonation products may, without isolation or purification, be reacted with formaldehyde.

The formaldehyde employed for the preparation of the additives of the present invention may be introduced in the form of its aqueous solution, preferably a 30–39% by weight solution. In place of such solution, however, there may be introduced equivalent quantities of substances which liberate formaldehyde under the reaction conditions. Paraformaldehyde, formaldehyde sodium hydrogen sulfite adducts, urotropin and trioxymethylene are examples of such formaldehyde-liberating substances.

The additives of the present invention have the diphenol and formaldehyde moieties in the molar ratio between about 5:1 and about 1:10. However, larger proportions of formaldehyde can be used in effecting the condensation inasmuch as this leaves free formaldehyde in the condensation product, and the free formaldehyde stabilizes the condensation product against gelatinizing. The use of formaldehyde in a ratio below those of the foregoing range does not produce a condensation product that imparts the specified surface tension to water. Requisite for the application of the condensation products in practice is a good water-solubility in order to ensure a uniform division in the mixing water of the building materials. Preferred are such condensation products as, related to one mol diphenol, contain at least one sulfo group. Condensation products of this kind may be prepared, for example, based on diphenols in which $m + m'$ is at least 1. The watersolubility of condensation products made from diphenols containing no sulfo groups or less than one sulfo group (which may be the case with impure reactants or mixtures of diphenols so that $m + m'$ is for instance 0 to 0.5) can be improved by the incorporation of sulfo groups. This is achieved by effecting the condensation in the presence of further modifiers. Preferred modifiers are: Water-soluble sulfites, such as sodium or potassium sulfite and sodium or potassium hydrogen sulfite; water-soluble pyrosulfites, such as sodium or potassium pyrosulfite; water-soluble sulfamates, such as sodium, potassium or ammonium sulfamate; as well as salts, preferably sodium, potassium or ammonium salts, of phenol sulfonic acids or naphthalene sulfonic acids. These modifiers are introduced in such a quantity that the molar ratio of modifier to diphenol is between about 1:100 and about 1:2, although the sulfites, bisulfites, pyrosulfites and sulfamates can be used in mol ratios as high as 6:1. The modifiers involved in the condensation are applied preferably in such an amount that the finished condensation products contain at least one sulfo group referred to one mol diphenol.

The condensation products thus modified appear to contain additional —$CH_2$—Y—$SO_3$Me groups on the nuclei of the diphenol, these groups resulting from the reaction of the modifiers with methylol groups in the condensation products. In these added groups, Y is a simple bond, an NH group or a group of the formulae

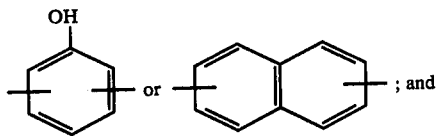

Me is a proton or an alkali metal, alkaline earth metal or ammonium cation.

The condensation is conveniently carried out by heating a mixture of the reactants with excess water with or without pH-adjusting acid or base. Stirring is helpful, and suitable reaction temperatures are from about 60° to about 140° C, and preferably from about 80° to about 120° C. The condensation time is easily and quickly determined by measuring the surface tension of the reaction mixture, and is different for each different combination of reactants as well as for different dilutions of the reactants. Condensation products very effective as the desired additives are obtained when a 20% by weight aqueous solution of the non-volatile condensation products shows at 25° C a surface tension of about 60 to about 80 milliNewtons per meter. This surface-tension unit is the same unit previously called "dynes per centimeter".

The higher the concentration of reactants, the lower the duration of the condensation. The condensation is generally carried out in a concentration range that produces a solution of about 10 to about 60%, and preferably about 15 to about 25% content of the desired solid condensate. Concentrations above about 40%, however, often rapidly produce highly viscous solutions of condensate, making it difficult to complete the condensation and determine the end point. However effecting the condensation at high concentrations saves time, and the highly concentrated condensate solutions thus made may be readily thinned with water, if desired.

The pH value at which the condensation is carried out can range from about 3 to about 12. Preferably, the condensation is done at pH values ranging from 7.5 to 12. If the condensation is effected within this alkaline pH range, a water-soluble condensate is even obtained when the diphenol does not have any sulfo groups. For adjusting the pH to below 7, inorganic or organic acids may be employed, e.g. sulfuric acid, nitric acid, phosphoric acid, and lower aliphatic carboxylic acids such as formic acid or acetic acid. For adjustment of the pH to above 7; inorganic or organic bases may be employed, e.g. hydroxides, oxides or carbonates of alkali or alkaline earth metals, particularly sodium, potassium, calcium or magnesium ammonia or primary, secondary or tertiary amines, preferably those having lower aliphatic radicals.

The aqueous condensate solutions obtained in the abovedescribed manner may be used directly as the additives of the present invention. They may also be stored for substantial periods of time prior to use, without losing effectiveness. The solutions of the condensation products may also be converted into water-soluble powder as by spray drying, however, and added as such powder to the hydraulic bonding mixtures.

Between about 0.05 and about 5% of the additive, based on the weight of the bonding agent contained in the hydraulic construction material, is used. The additive may be added to the mixing water prior to, during, or subsequent to the mixing of the construction material. However the improvement in spreadability would be wasted unless the additive is incorporated in the bonding mixture before it is spread. The additives of the present invention improve the flowability and strength of cement, mortar, concrete and plaster. These improvements can be made useful in different ways; good spreadability may be obtained with a considerably reduced water requirement and this provides mortar, cement and concrete with considerably improved early and final strengths. On the other hand without reducing the usual proportion of water or changing the strength of the product, more thinly liquid compositions are obtained which flow better to automatically equalize unevennesses and form more truly horizontal, level surfaces. Alternatively an intermediate proportion of water can be used to provide an increase in spreadability as well as a smaller increase in both early and final strengths. Construction materials with a high early strength are of considerable economic importance, since they allow an earlier stripping of mold forms, and a high final strength leads to savings in the quantity of materials needed. In addition, the adhesion of the more spreadable mortar, cement, concrete and plaster on old cement and concrete is considerably improved, and for the preparation of a processable plaster paste, the required quantity of water is also reduced.

Examples for the preparation of the additives of the present invention and the results of effectiveness tests are given in tables 1 through 4. In these tables, column 1 merely gives the consecutive number of the examples. The same condensation products have the same number even though listed in different tables. Columns 2a through 10 list the materials and condensation conditions used to make the additives, and column 11 gives the test results.

Columns 2a, 2b and 2c list respectively the quantity of aqueous diphenol solution used to make the condensate, the coded identity of the diphenol, and the concentration of that solution. The quantity of formaldehyde solution is given in column 3; the quantity and coded identity of modifier in columns 4a and 4b; the quantity and coded identity of alkali in columns 5a and 5b; the mol proportion of formaldehyde, modifier and alkali per mol of diphenol, in column 6; and the quantity of water added to make the reaction mixture, in column 7.

The reaction mixtures were heated with stirring and maintained for the hours shown in column 8a at the temperature shown in column 8b. The mixtures were then cooled to room temperature, yielding light yellow aqueous resin solutions infinitely miscible with water, having the concentration given in column 9 and when adjusted to 20% strength at 25° C, have the surface tension given in column 10.

The resin solutions thus obtained retain their activity when stored for several months, as well as when converted by spray drying into powder which is stored and then redissolved.

The coded identifications are

A = pure 4,4'-dihydroxydiphenylsulfone.

B = crude dihydroxydiphenylsulfone prepared by 10-hour-long reaction of phenol with 96% sulfuric acid in a molar ratio of 2:1.25 at 140° C; the separated condensation water being simultaneously distilled off in vacuum at 400 to 20 mm.

C = crude dihydroxydiphenylsulfone, prepared by ten-hour-long reaction of phenol with 96% sulfuric acid in a molar ratio of 2:1 at 160° C, the separated condensation water being simultaneously distilled off in vacuum at 400 to 20 mm. A little phenol distils off with the water, and the combined distillate which contains about 5 to 7% phenol is used as diluent in preparing the condensation reaction mixture.

D = sulfonated 4,4'-dihydroxydiphenylsulfone, prepared by the sulfonation of 4,4'-dihydroxydiphenylsulfone in accordance with the German Pat. No. 1,203,737, Example 1, which reads as follows: 70 parts-by-weight 4,4'-dihydroxydiphenylsulfone are stirred in 35 parts-by-weight acetic anhydride, admixed with 35 parts sulfuric acid monohydrate and heated for 5 to 6 hours as high as 98° to 100° C. Subsequently, some 95%-by-weight of the employed acetic anhydride was distilled off in the form of acetic acid from the reaction mixture in vacuum whilst repeatedly adding water.

F = 40%-by-weight aqueous solution of sodium sulfamate.

G = 25%-by-weight aqueous solution of sodium hydrogen sulfite.

H = 30%-by-weight aqueous sodium hydroxide.

I = 50%-by-weight aqueous sodium hydroxide.

The results listed in column 11 were obtained as follows:

1. Thinning of Cement Mortar (Table 1)

Added to a mixture of 1000 g standard sand, coarse, 500 g standard sand, fine, 500 g portland cement, and 250 g water (water-cement factor = 0.5) are 12 g of the aqueous solution of col. 9. After mixing all the constituents in a mortar mixer according to DIN 1164, leaf 7, a spreading test was carried out on a vibrating table in accordance with item 9.10.10 of DIN 1060. The blank test sample showed a spread of 12 to 14 cm.

The evaluations given in column 11 were according to the following classification:

| Spread | Symbol |
|---|---|
| 13 – 16 cm | − |
| 16 – 19 cm | + |
| 20 – 24 cm | + + |
| 25 – 30 cm | + + + |

2. Early strength of Cement Mortar (Table 2)

A mixture of cement mortar was prepared by the method described in Table 1. As noted, however, some were prepared with condensates that contain very little water in which cases the spread test showed spreads of 15 – 18 cm. This mortar was then cast into standard prism forms having inside dimensions of 40 × 40 × 160 mm, with the help of vibration, then set 24 hours after which the resulting cast prism was removed from the mold and its bending strength tested according to DIN 1164, leaf 7.

The evaluation in column 11 of Table 2 took place in accordance with the following classification:

| Improvement of Bending Strength in Comparison to Blank Value | | Symbol |
|---|---|---|
| by 10 to 20% | good | + |
| by 20 to 40% | very good | + + |

3. Three-day Compressive Strength of Cement Mortar (Table 3)

Standard prism forms were prepared as in Table 2, and after 3 days tested for their compressive strength.

| Improvement of Compressive Strength in Comparison to Blank Value | | Symbol |
|---|---|---|
| by 10 to 20% | good | + |
| by 20 to 40% | very good | + + |

4. Thinning of Plaster (Table 4)

Added to a mixture of 400 g plaster of paris, 200 g water, are 3 g of the aqueous solution of a condensation product prepared as described in connection with Table 1. After mixing the constituents in a mortar mixer according to DIN 1164, leaf 7, the spread was tested as also described in connection with Table 1.

A blank test yielded a spread of 13 to 15 cm, and the evaluations given in column 11 of Table 4 took place according to the following classification:

| Spread | Symbol |
|---|---|
| 13 to 15 cm | − |
| 16 to 19 cm | + |

The surface tension mentioned in the text may be measured with any surface tension testing for example according to the ring adhesion method using a tensiometer in accordance with Lecomte du Nouy. This measures the force that is necessary to lift from the liquid an evenly balanced, horizontally suspended ring touching the surface of the liquid to be measured and wetted by it (see Ullmanns, loc. cit., Third Ed. (1961), Vol 2/1, p. 773.

The additives of the present invention can be separately packaged for use in compounding with the hydraulic construction mixes, or they can be added to packaged dry mixes or to one or more of the ingredients used to make the water-containing final mixtures. Thus the additives in the form of dried powder can be mixed with hydraulic or portland cement powder, or with sand or with gravel, or with plaster of paris powder, or with powdered calcium carbonate or stone, or with powdered slaked lime, or with any other ingredient such as powdered gypsum or burnt magnesite used as a filler. Such additive mixtures are best formulated such that when the ingredients of the settable construction mix are combined, the additive will be in proper proportion to the binding agent. Thus where sand is used in an amount 3 times that of portland cement by weight to make a mix, the spray-dried condensate of the present invention can be mixed with sand in a concentration of 1/12% to yield a final mix having ¼% of the condensate.

Obviously many modifications and variations of the present invention are possible in the light of the above teachings. It is, therefore, to be understood that within the scope of the appended claims the invention may be practiced otherwise than as specifically described.

Table 1
Thinning of Cement Mortar

| 1 No. | 2a Diphenol g. | 2b | 2c conc. | 3 Formaldehyde 39% g. | 4a Modifier g. | 4b | 5a Alkali g. | 5b | 6 Mol. Proportion 1 : HCHO | Modifier | Alkali | 7 Added Water g. | 8a Condensation Condition h | 8b °C | 9 Concentration of Condensate Wt. % | 10 Surface Tension m N/m | 11 Effectiveness |
|---|---|---|---|---|---|---|---|---|---|---|---|---|---|---|---|---|---|
| 1 | 445 | A | 73.0% | 150 | — | | 116 | H | 1.5 | : — : | 0.67 | 1370 | 13 | 100 | 19 | 72.5 | + + + |
| 2 | 445 | A | 73.0% | 600 | — | | 116 | H | 6 | : — : | 0.67 | 1800 | 8 | 100 | 16 | 62.5 | + + + |
| 3 | 445 | A | 73.0% | 150 | 78 | F | 87 | H | 1.5 | :0.2: | 0.5 | 1440 | 18 | 100 | 19 | 71.5 | + + + |
| 4 | 445 | A | 73.0% | 150 | 78 | F | 87 | H | 1.5 | :0.2: | 0.5 | 1440 | 90 | 80 | 19 | 72.0 | + + + |
| 5 | 422 | A | 77.3% | 150 | 195 | F | 173 | H | 1.5 | :0.5: | 1 | 1620 | 14 | 120 | 19 | 72.8 | + + + |
| 6 | 278 | B | 90.0% | 115 | — | | 110 | I | 1.5 | : — : | 1.4 | 1200 | 24 | 100 | 20 | 69.2 | + + + |
| 7 | 278 | B | 90.0% | 115 | 60 | F | 110 | I | 1.5 | :0.2: | 1.4 | 1250 | 35 | 100 | 20 | 73.0 | + + + |
| 8 | 260 | C | 96.0% | 115 | 60 | F | 93 | I | 1.5 | :0.2: | 1.16 | 1250 | 20 | 100 | 20 | 73.1 | + + + |
| 9 | 260 | C | 96.0% | 230 | 60 | F | 54 | I | 3 | :0.2: | 0.67 | 1150 | 12 | 100 | 20 | 73.8 | + + + |
| 10 | 400 | D | 83.0% | 462 | — | | 320 | H | 6 | : — : | 2.4 | 1100 | 18 | 100 | 23 | 66.8 | + + + |
| 11 | 400 | D | 83.0% | 462 | 60 | F | 346 | H | 6 | :0.2: | 2.6 | 1200 | 20 | 100 | 23 | 65.2 | + + + |
| Phenolic condensate of German Offenlegungsschrift DOS 2 204 275, Example 6c, 100% | | | | | | | | | | | | | | | | 54.6 | + |
| Sulfite-modified melamine condensate of German Auslegesschrift DAS 1 671 017, Example A | | | | | | | | | | | | | | | | 72.6 | — |

Table 2
Early Strength of Cement Mortar

| 1 No. | 2a Diphenol g. | 2b | 2c conc. | 3 Formaldehyde 39% g. | 4a Modifier g. | 4b | 5a Alkali g. | 5b | 6 Mol Proportion 1 : HCHO | Modifier | Alkali | 7 Added Water g. | 8a Condensation Condition h | 8b °C | 9 Concentration of Condensate Wt. % | 10 Surface Tension m N/m | 11 Improvement of Bending Strength |
|---|---|---|---|---|---|---|---|---|---|---|---|---|---|---|---|---|---|
| 1 | | | | | | | | | | | | | | | | | + + |
| 3 | | | | | | | | | | | | | | | | | + + |
| 12 | 422 | A | 77.3% | 150 | 137 | F | 116 | H | 1.5 | :0.35: | 0.67 | 1540 | 40 | 100 | 20 | 73.4 | + + |
| 13 | 445 | A | 73.0% | 150 | 195 | F | 173 | H | 1.5 | :0.5 : | 1 | 1595 | 45 | 100 | 19 | 73.4 | + + |
| 14 | 125 | A | 100% | 57.8 | 113 | F | 67 | H | 1.5 | :0.75: | 1 | 150 | 10 | 100 | 38 | 78.3 | + + |
| 15 | 268 | A | 70.0% | 173 | 450 | F | 100 | H | 3 | : 2 : | 1 | 144 | 13 | 100 | 38 | 64.6 | + + |
| 6 | | | | | | | | | | | | | | | | | + + |
| 7 | | | | | | | | | | | | | | | | | + + |
| 8 | | | | | | | | | | | | | | | | | + + |
| Phenolic condensate of German Offenlegungsschrift DOS 2 204 275, Example 6c, 100% | | | | | | | | | | | | | | | | 54.6 | + |
| Sulfite-modified melamine condensate of German Auslegesschrift DAS 1 671 017, Example A | | | | | | | | | | | | | | | | 72.6 | + |

Table 3
Three-day Compressive Strength of Cement Mortar

| 1 No. | 2a Diphenol g. | 2b | 2c conc. | 3 Formaldehyde 39% g. | 4a Modifier g. | 4b | 5a Alkali g. | 5b | 6 Mol Proportion 1 : HCHO | Modifier | Alkali | 7 Added Water g. | 8a Condensation Condition h | 8b °C | 9 Concentration of Condensate Wt. % | 10 Surface Tension m N/m | 11 Improvement of Bending Strength |
|---|---|---|---|---|---|---|---|---|---|---|---|---|---|---|---|---|---|
| 16 | 149 | A | 77.3% | 53 | 104 | F | 37 | I | 1.5 | :0.75: | 1 | 310 | 14 | 100 | 28 | 73.8 | + + |
| 14 | | | | | | | | | | | | | | | | | + + |
| 15 | | | | | | | | | | | | | | | | | + + |
| 8 | | | | | | | | | | | | | | | | | + + |
| 17 | 162 | A | 100% | 150 | 406 | G | 87 | H | 3 | :1.5 : | 1 | 195 | 36 | 100 | 35 | 63.9 | + + |
| Phenolic condensate of German Offenlegungsschrift DOS 2 204 275, Example 5b | | | | | | | | | | | | | | | | | + |
| Sulfite-modified melamine condensate of German Auslegesschrift DAS 1 671 017, Example A | | | | | | | | | | | | | | | | 72.6 | + |

Table 4
Thinning of Plaster

| 1 No. | 2a Diphenol g. | 2b | 2c Conc. | 3 Formaldehyde 39% g. | 4a Modifier g. | 4b | 5a Alkali g. | 5b | 6 Mol. Proportion 1 : HCHO | Modifier | Alkali | 7 Added Water g. | 8a Condensation Condition h | 8b °C | 9 Concentration of Condensate Wt. % | 10 Surface Tension m N/m | 11 Effectiveness |
|---|---|---|---|---|---|---|---|---|---|---|---|---|---|---|---|---|---|
| 1 | | | | | | | | | | | | | | | | | + |
| 3 | | | | | | | | | | | | | | | | | + |
| 18 | 445 | A | 73.0% | 150 | 78 | F | 116 | H | 1.5 | :0.2 : | 0.67 | 1453 | 16 | 100 | 19 | 70.8 | + |
| 19 | 278 | B | 90.0% | 115 | 60 | F | 110 | I | 1.5 | :0.2 : | 1.4 | 1250 | 18 | 100 | 20 | 72.3 | + |

Table 4-continued

| | | | | | | | Thinning of Plaster | | | | | | | | |
|---|---|---|---|---|---|---|---|---|---|---|---|---|---|---|---|
| 1 | 2a | 2b | 2c | 3 Formaldehyde 39% | 4a | 4b | 5a 5b Alkali | 6 Mol. Proportion 1 : | | | 7 Added Water | 8a 8b Condensation Condition | | 9 Concentration of Condensate | 10 Surface Tension | 11 Effectiveness |
| No. | Diphenol g. | | Conc. | g. | Modifier g. | | g. | HCHO | Modifier | Alkali | g. | h | °C | Wt. % | m N/m | |
| Sulfite-modified melamine condensate of German Auslegesschrift DAS 1 671 017, Example A | | | | | | | | | | | | | | | 72.6 | + |

What is claimed:

1. A water-soluble condensation product of formaldehyde, a diphenol

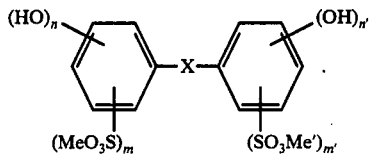

wherein
X is a direct bond, or —SO$_2$—, —SO—, —S—, —CH$_2$—, —C(CH$_3$)$_2$—, or —CO—,
n and n' are independently 1 or 2,
m and m' total no more than 0.5, and
Me and Me' are independently a proton, an alkali metal, alkaline earth metal, or ammonium cation,
and a water-soluble sulfamate, the molor proportion of diphenol to formaldehyde being between about 5:1 and about 1:10, and mol ratio of sulfamate to diphenol is between about 1:100 and 6:1, and a 20%-by-weight aqueous solution of the condensation product at 25° C showing a surface tension of about 60 to about 80 millinewtons per meter.

2. The condensation product of claim 1 in which n and n' are each 1 and X is —SO$_2$—.

3. The condensation product of claim 2 in which the diphenol is essentially 4,4'-dihydroxydiphenylsulfone.

4. The condensation product of claim 1 in which there is at least one sulfo group per mol of diphenol.

* * * * *